(12) United States Patent
Berlusconi

(10) Patent No.: US 10,060,562 B2
(45) Date of Patent: Aug. 28, 2018

(54) METHOD AND ASSEMBLY FOR THE CONNECTION OF TWO TUBULAR MEMBERS

(71) Applicant: R.P.E. S.r.l., Carbonate (IT)

(72) Inventor: Giordano Berlusconi, Veniano (IT)

(73) Assignee: R.P.E. S.R.L., Carbonate (IT)

( * ) Notice: Subject to any disclaimer, the term of this patent is extended or adjusted under 35 U.S.C. 154(b) by 462 days.

(21) Appl. No.: 14/766,154

(22) PCT Filed: Feb. 20, 2014

(86) PCT No.: PCT/IB2014/059137
§ 371 (c)(1),
(2) Date: Aug. 6, 2015

(87) PCT Pub. No.: WO2014/128649
PCT Pub. Date: Aug. 28, 2014

(65) Prior Publication Data
US 2015/0369412 A1   Dec. 24, 2015

(30) Foreign Application Priority Data

Feb. 20, 2013 (IT) .............................. MI2013A0240

(51) Int. Cl.
| F16L 37/08 | (2006.01) |
| F16L 37/084 | (2006.01) |
| F16L 19/02 | (2006.01) |
| F16L 21/08 | (2006.01) |

(52) U.S. Cl.
CPC ....... *F16L 37/0847* (2013.01); *F16L 19/0231* (2013.01); *F16L 21/08* (2013.01)

(58) Field of Classification Search
CPC . F16L 37/0847; F16L 37/088; F16L 37/0985; F16L 37/0987
USPC .......................... 285/322, 323, 308, 314, 321
See application file for complete search history.

(56) References Cited

U.S. PATENT DOCUMENTS

| 2,828,982 | A | * | 4/1958 | Kennedy | ................. F16L 37/10 285/323 |
| 4,850,621 | A | * | 7/1989 | Umehara | .............. F16L 13/142 285/322 |
| 5,042,848 | A | * | 8/1991 | Shiozaki | ............... F16L 37/133 285/323 |
| 5,284,369 | A | * | 2/1994 | Kitamura | ........... F16L 37/0985 285/322 |
| 6,199,920 | B1 | * | 3/2001 | Neustadtl | ........... F16L 37/0985 285/322 |

(Continued)

FOREIGN PATENT DOCUMENTS

| DE | 43 03 596 | 8/1994 |
| WO | WO 2008/138351 | 11/2008 |

*Primary Examiner* — David Bochna
(74) *Attorney, Agent, or Firm* — Leason Ellis LLP

(57) ABSTRACT

An assembly for the connection of tubular members is provided with a connection sleeve which is suited to connect one to the other a first tubular member and a second tubular member, and an intermediate coupling ring mounted to slide along at least an intermediate coupling portion of the first tubular member; the coupling portion having a diameter ranging from a minimum to a maximum so that the sliding of the coupling ring (4) along the coupling portion causes the deformation of the coupling ring in a locking configuration of the connection sleeve to the first tubular member.

13 Claims, 4 Drawing Sheets

(56) References Cited

U.S. PATENT DOCUMENTS

| | | | |
|---|---|---|---|
| 6,349,978 B1 * | 2/2002 | McFarland | F16L 37/0985 285/322 |
| 6,419,281 B1 * | 7/2002 | Salomon-Bahls | F16L 37/098 285/322 |
| 7,677,610 B2 * | 3/2010 | Schwarz | F16L 25/0045 285/322 |
| 2008/0157520 A1 * | 7/2008 | Ryhman | F16L 37/098 285/322 |

* cited by examiner

METHOD AND ASSEMBLY FOR THE CONNECTION OF TWO TUBULAR MEMBERS

CROSS REFERENCE TO RELATED APPLICATIONS

The present application is a U.S. National Phase of International Patent Application PCT/IB2014/059137 filed on Feb. 20, 2014, which claims priority to Italian Application No. MI2013A000240, filed on Feb. 20, 2013, each of which is incorporated by reference as if expressly set forth in their respective entireties herein.

TECHNICAL FIELD

The present invention relates to an assembly for the connection of two tubular members.

BACKGROUND ART

In particular, the present invention relates to a connection assembly comprising a connection sleeve, for example a threaded ring nut, mounted on a first tubular member and connectable to a second tubular member.

The connection sleeve is arranged in abutment against an abutment formed at a free end of the first tubular member and for this reason has a minimum diameter which is smaller than the diameter of the abutment and greater than the maximum diameter of the remaining part of the first tubular member.

The connection sleeve must be, therefore, inserted onto the tubular member from the opposite end to that provided with the abutment.

Consequently, the connection assembly of the known type described above is of a reduced use and is not easy to use or replace in particular when the first tubular member is relatively long.

DISCLOSURE OF INVENTION

It is an object of the present invention to provide an assembly for the connection of two tubular members which is free from the drawbacks described above and which is simple and cheap to implement.

According to the present invention, there is provided an assembly for the connection of two tubular members, the connection assembly comprising a tubular member; a connection sleeve, which can be coupled to the tubular member, and is configured to be coupled to a further tubular member; and an intermediate coupling ring mounted to slide along at least one coupling portion of the tubular member; the coupling portion having a diameter ranging from a minimum to a maximum so that the sliding movement of the coupling ring along the coupling portion causes the deformation of the coupling ring in a locking configuration in which the connection sleeve is locked to the tubular member.

Thanks to the present invention, the connection sleeve can be easily inserted at the end of the tubular member to be connected.

According to a preferred embodiment of the present invention, the coupling ring is elastically deformable.

This allows to expand at least part of the coupling ring so as to couple the connection sleeve to the tubular member.

Preferably, the coupling ring is open and has two free ends which are separate from one another.

This conformation allows to arrange the coupling ring around the tubular member without inserting it. This solution is particularly advantageous for the fact that the coupling ring has, at rest, a maximum diameter smaller than the maximum diameter of the tubular member.

According to a preferred embodiment of the present invention, the coupling ring has, in a release configuration of the connection sleeve, a minimum diameter which is smaller than the maximum diameter of the coupling portion.

In fact, the coupling ring is initially arranged around the tubular member in correspondence to the coupling portion.

Preferably, the coupling ring is coupled to the coupling portion in a rotatory manner so as to rotate and slide, respectively, around and along the tubular member.

According to a preferred embodiment of the present invention, the coupling ring has at least one locking member, which radially projects from the coupling ring and the connection sleeve has at least one recess which is suited to receive and hold the locking member itself.

In this way, when the coupling ring is deformed, the connection sleeve is retained onto the tubular member.

According to a preferred embodiment of the present invention, the coupling ring comprises a collar and a plurality of elastically deformable wings, which axially project from the collar, and are delimited by a substantially cylindrical inner surface having, in the release configuration of the connection sleeve, a diameter which is smaller than the maximum diameter of the coupling portion.

At the same time, the coupling ring comprises a plurality of teeth which are each obtained on a respective wing and the connection sleeve comprises a plurality of recesses which each receive and hold a respective tooth.

In this way, the connection is distributed, preferably uniformly, along the perimeter of the connection sleeve.

A further object of the present invention is to provide a method for the connection of two tubular members which is free from the drawbacks of the known art.

According to the present invention, there is provided a method for the connection of two tubular members, the method comprising the steps of:

fitting an intermediate coupling ring on a coupling portion of a tubular member, the coupling portion having a diameter ranging from a minimum to a maximum;

fitting a connection sleeve onto the tubular member, the connection sleeve being configured to be coupled to a further tubular member;

moving the coupling ring along the coupling portion so as to allow the variable diameter of the coupling portion to deform the coupling ring in a locking configuration in which the connection sleeve is locked to the tubular member.

BRIEF DESCRIPTION OF THE DRAWINGS

The present invention will now be described with reference to the accompanying drawings, which illustrate a non-limiting embodiment, wherein.

BEST MODE FOR CARRYING OUT THE INVENTION

Figure 1:
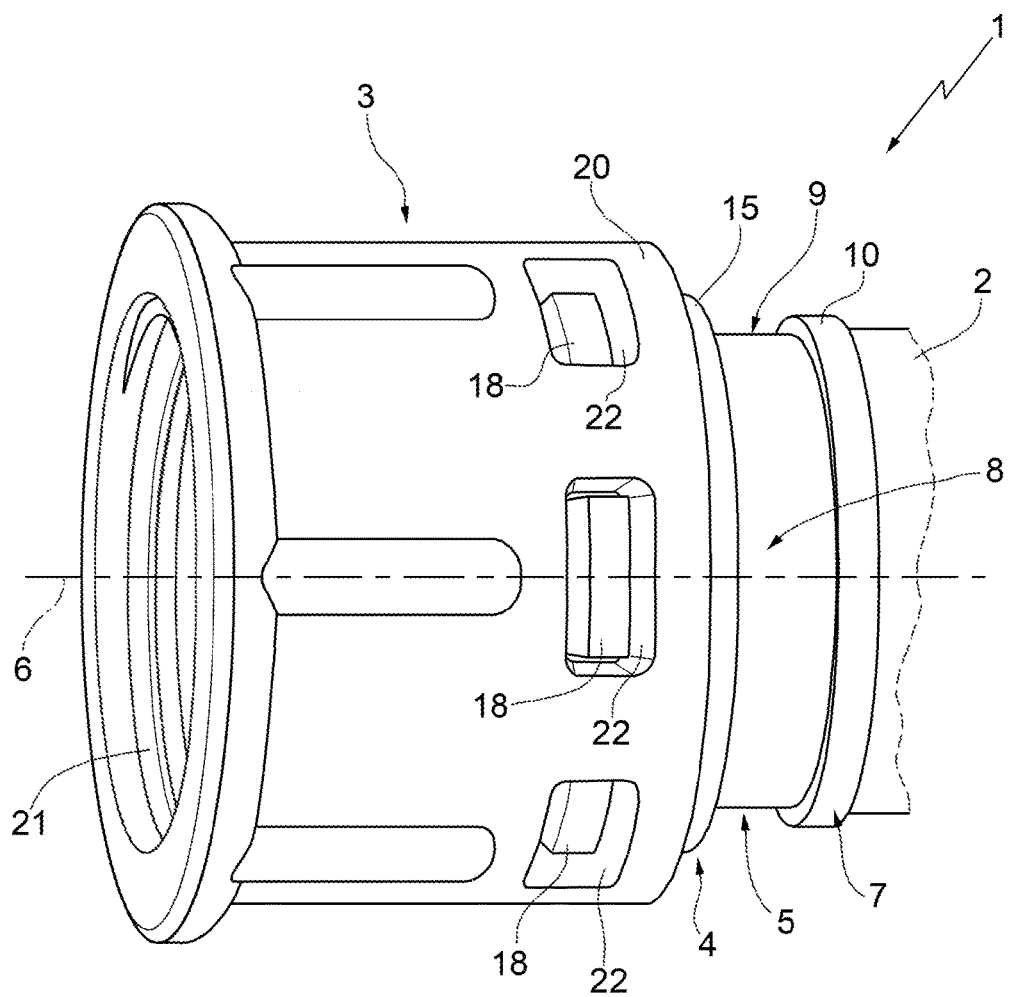
FIG. 1 is a schematic perspective view of a preferred embodiment of the connection assembly of the present invention.
Figure 2:
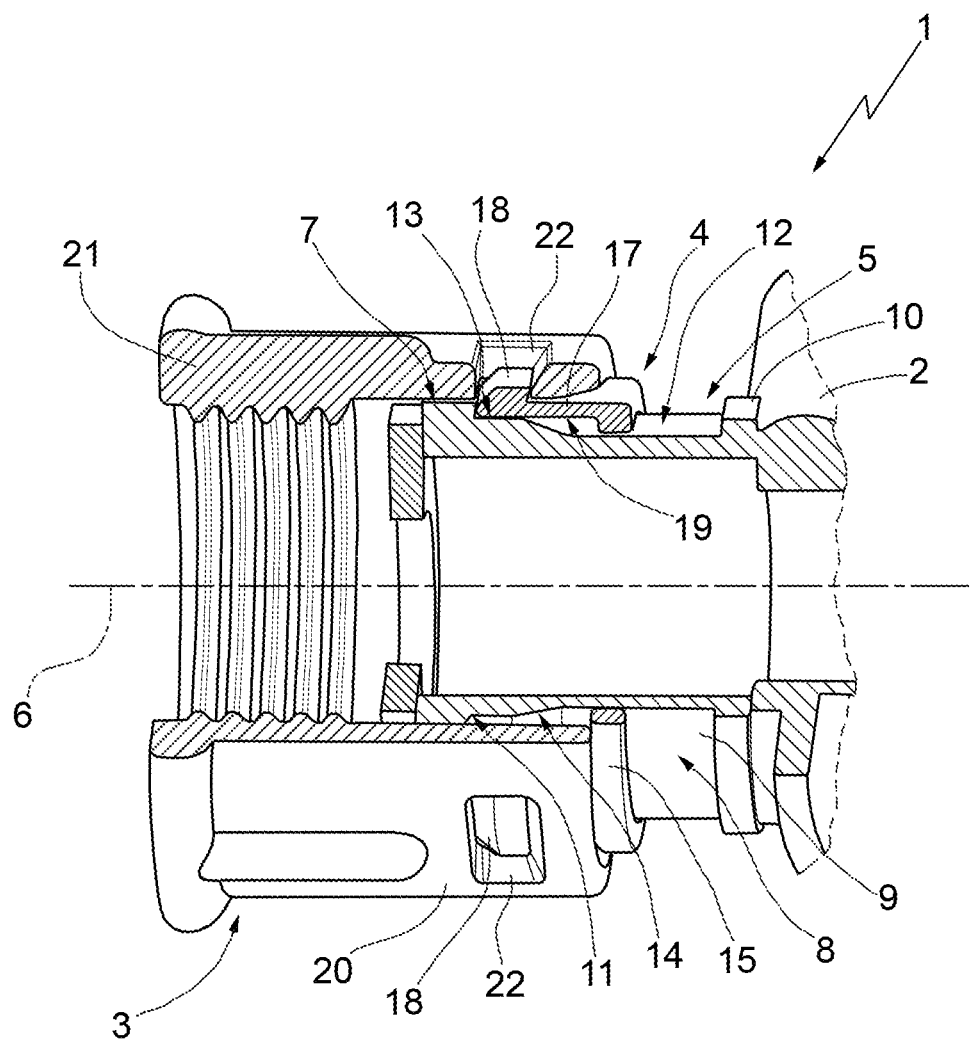
FIG. 2 is a schematic longitudinal section of the connection assembly of FIG. 1.

With reference to FIGS. 1 and 2, with 1 is indicated, as a whole, a connection assembly for tubular members comprising a first tubular member 2; a connection sleeve 3 which can be coupled to the tubular member 2 and configured to be coupled to a second tubular member (not shown); and an intermediate coupling ring 4 mounted onto the tubular member 2 to lock the sleeve 3 to the tubular member 2 itself.

The tubular member 2 can be, for example, a valve body of a valve, a fitting, or a manifold, while the sleeve 3 may be, for example, a threaded nut ring or a bayonet fitting.

The tubular member 2 comprises an end segment 5, which has a longitudinal axis 6, is delimited by an outer surface 7 substantially coaxial with the axis 6, and has a shaped annular cavity 8, extending around the axis 6, and which opens outwards at the surface 7.

The cavity 8 defines onto the tubular member 2 a coupling portion 9, which is engaged in a sliding manner by the ring 4, and is axially delimited by two end abutments 10, 11 which are substantially perpendicular to the axis 6.

The portion 9 is shaped so as to comprise a narrow segment 12, which has a substantially cylindrical shape, and is axially delimited by the abutment 10; a wide segment 13, which has a substantially cylindrical shape, and is axially delimited by the abutment 11; and an intermediate connecting segment 14, which extends between the segments 12 and 13, and substantially presents the shape of a truncated cone.

From the foregoing it follows that the portion 9 has a diameter ranging from the minimum diameter of the segment 12 and the maximum diameter of the segment 13.

The ring 4 is housed in the portion 9 coaxially with the axis 6, is coupled in rotary and axially sliding manner to the segment 5, and has a length, measured parallel to the axis 6, at most equal to a length of the segment 12 also measured parallel to the axis 6.

Figure 3:
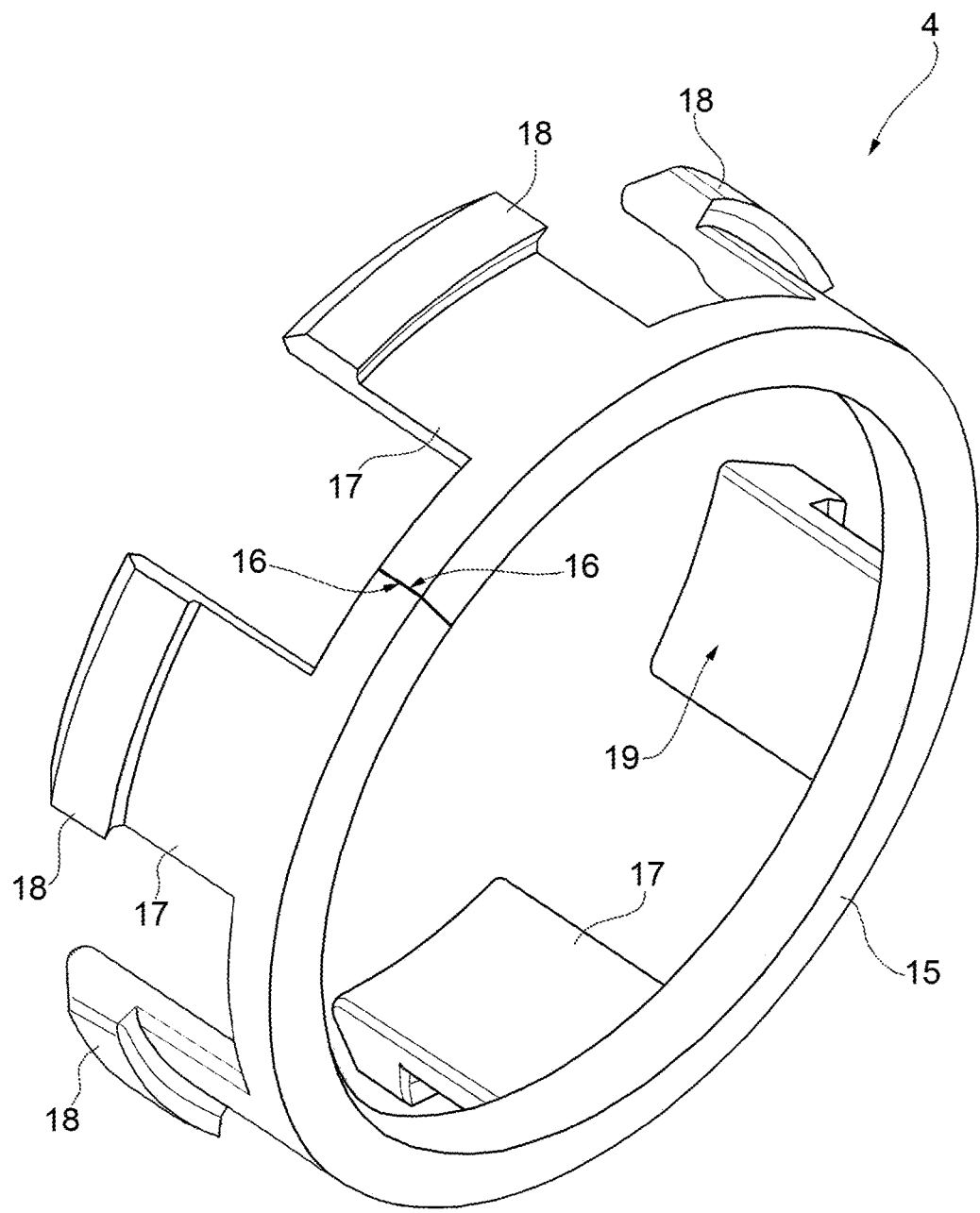
FIG. 3 is a schematic perspective view of a first detail of FIGS. 1 and 2.
Figure 4:
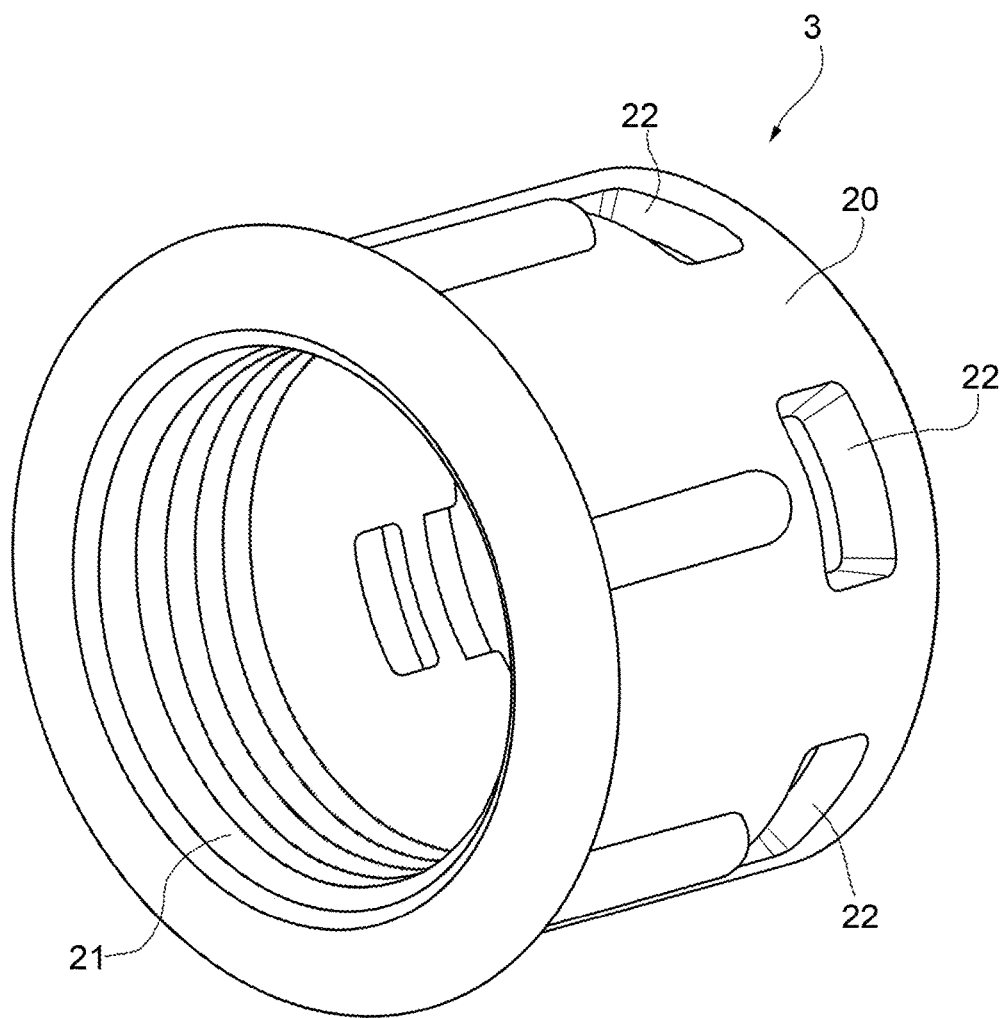
FIG. 4 is a schematic perspective view of a second detail of FIGS. 1 and 2.

As illustrated in FIGS. 2 and 3, the ring 4 comprises an open collar 15 having two free ends 16 which are separate from one another; and a plurality of elastically deformable wings 17, which are uniformly distributed around the axis 6, and axially project from the collar 15 towards the abutment 11.

Each wing 17 has a thickness, measured transversely to the axis 6, smaller than a thickness of the collar 15 also measured transversely to the axis 6, and is provided with a tooth 18 radially projecting outwards from the wing 17 itself.

Each wing 17 is also radially delimited by a inner surface, which defines, together with the inner surfaces of the other wings 17, a lateral surface 19, which presents, in an initial release configuration of the sleeve 3, a cylindrical shape and a diameter less than the diameter of the wide segment 13 of the portion 9.

With reference to FIGS. 2 and 3, the sleeve 3 comprises a coupling portion 20, which has a diameter approximately equal to a diameter of the outer surface 7 of the segment 5, is fitted on the segment 5 coaxially with the axis 6, and extends around the ring 4.

In the present case, the sleeve 3 further comprises a threaded connecting portion 21, which axially projects from a free end of the tubular member 2 to be screwed on said second tubular member (not shown).

The sleeve 3 also has a plurality of recesses 22, which are obtained through the portion 20 perpendicularly to the axis 6, are equal in number to the number of the wings 17, and are arranged so as to receive and hold, each, a respective tooth 18.

In use, the ring 4 is elastically deformed to be inserted on the narrow segment 12 of the coupling portion 9 of the tubular member 2, and is moved close to, or in contact with, the abutment 10.

Subsequently, the connection sleeve 3 is fitted at first onto the segment 5 and then onto the ring 4 so as to elastically deform the wings 17 towards the inside and cause the engagement of the teeth 18 in the respective recess 22.

Once the sleeve 3 is locked to the ring 4, the assembly defined by the sleeve 3 and by the ring 4 is moved axially along the tubular member 2 so as to move the wings 17 in contact with the abutment 11.

The variation in diameter of the portion 9, i.e. the transition from the minimum diameter of the narrow segment 12 to the maximum diameter of the wide segment 13, allows the intermediate segment 14 to elastically deform the wings 15 towards the outside and to block, then, the teeth 18 within the respective recesses 22.

In other words, the sliding of the assembly defined by the sleeve 3 and by the ring 4 along the tubular member 2 and towards the abutment 11 causes the deformation of the ring 4 in a locking configuration, wherein the sleeve 3 is coupled in axially and angularly fixed manner to the ring 4 and is locked to the tubular member 2.

To release the sleeve 3 from the ring 4, the assembly defined by the sleeve 3 and by the ring 4 is moved along the portion 9 towards the abutment 10 so as to disengage the wings 17 from the wide segment 13 and from the intermediate segment 14 of the portion 9 itself.

According to a variant not shown, the wings 17, the teeth 18, and the recess 22 are removed and replaced, for example, with an annular locking flange, which radially projects outwards from the ring 4, and engages, when the ring 4 is arranged in its locking configuration, an annular recess formed on the inner surface of the portion 20.

According to a further variant not shown, the wings 17, the teeth 18, and the recess 22 are removed and the sleeve 3 and the ring 4 are blocked by friction between the inner surface of the sleeve 3 and the outer surface of the ring 4 following the displacement of the ring 4 in its locking configuration.

The intermediate coupling ring 4 and the coupling portion 9 of the tubular member 2 allow, therefore, to fit the connection sleeve 3 onto the tubular member 2 directly from the free end of the segment 5 independently from the conformation of the tubular member 2 itself.

Finally, it is evident that the present invention can be modified and varied without departing from the scope of protection of the appended claims.

The invention claimed is:

1. An assembly for the connection of two tubular members, the connection assembly comprising a tubular member (2); an intermediate coupling ring (4), which is mounted so as to slide along at least one coupling portion (9) of the tubular member (2), is elastically deformable, is open, and has two free ends (16), which are separate from one another; and a connection sleeve (3), which can be coupled to the tubular member (2), and is configured to be coupled to a further tubular member, and comprises at least one coupling portion (20), which is configured to slide along the tubular member (2) and be coupled to the coupling ring (4); the coupling portion (9) of the tubular member (2) having a diameter ranging from a minimum to a maximum, so that the sliding movement of the coupling ring (4) along the coupling portion (9) of the tubular member (2) causes the deformation of the coupling ring (4) in a locking configuration in which the connection sleeve (3) is locked to the tubular member (2); wherein the coupling ring (4), when it is arranged in its locking configuration, is coupled to the connection sleeve (3) in an angularly and axially fixed manner.

2. A connection assembly according to claim 1, wherein the coupling ring (4) has, in a release configuration in which the connection sleeve (3) is released, a minimum diameter which is smaller than the maximum diameter of the coupling portion (9) of the tubular member (2).

3. A connection assembly according to claim 1, wherein the coupling ring (4) is coupled to the coupling portion (9) of the tubular member (2) in a rotary manner.

4. A connection assembly according to claim 1, wherein the coupling ring (4) has at least one locking member (18), which radially projects from the coupling ring (4), and the connection sleeve (3) has at least one recess (22), which is suited to receive and hold the locking member (18) itself.

5. A connection assembly according to claim 1, wherein the coupling ring (4) comprises a collar (15) and a plurality of elastically deformable wings (17), which axially project from the collar (15) and are delimited by a substantially cylindrical inner surface (19) presenting, in a release configuration in which the connection sleeve (3) is released, a diameter which is smaller than the maximum diameter of the coupling portion (9) of the tubular member (2).

6. A connection assembly according to claim 1, wherein the coupling ring (4) comprises a plurality of teeth (18), which are each obtained in a respective wing (17), and the connection sleeve (3) comprises a plurality of recesses (22), which each receive and hold a respective tooth (18).

7. A connection assembly according to claim 1, wherein the tubular member (2) presents at least one end abutment (10, 11), which is suited to stop the sliding movement of the coupling ring (4) along the coupling portion (9) of the tubular member (2).

8. A connection assembly according to claim 1, wherein the coupling portion (9) of the tubular member (2) comprises a narrow segment (12) presenting the minimum diameter and a wide segment (13) presenting the maximum diameter.

9. A connection assembly according to claim 8, wherein the coupling portion (9) of the tubular member (2) comprises, furthermore, an intermediate connecting segment (14) between the narrow segment (12) and the wide segment (13).

10. A connection assembly according to claim 9, wherein the narrow and wide segments (12, 13) present a cylindrical shape and the intermediate segment (14) presents the shape of a truncated cone.

11. A connection assembly according to claim 8, wherein the narrow segment (12) presents a length, measured parallel to a longitudinal axis (6) of the tubular member (2), which is at least equal to a length of the coupling ring (4), also measured parallel to the longitudinal axis (6).

12. A connection assembly according to claim 8, wherein the tubular member (2) presents two end abutments (10, 11), which are suited to stop the sliding movement of the coupling ring (4) along the narrow segment (12) and the wide segment (13), respectively, of the coupling portion (9) of the tubular member (2).

13. A method for the connection of tubular members, the method comprising the steps of:
    fitting an intermediate coupling ring (4) onto a coupling portion (9) of a tubular member (2), the coupling portion (9) presenting a diameter ranging from a minimum to a maximum, the intermediate coupling ring (4) being elastically deformable and open, and having two free ends (16), which are separate from one another;
    fitting a connection sleeve (3) onto the tubular member (2), the connection sleeve (3) being configured to be coupled to a further tubular member and comprising at least one coupling portion (20), which is configured to slide along the tubular member (2) and be coupled to the coupling ring (4);
    moving the coupling ring (4) along the coupling portion (9) so as to allow the variable diameter of the coupling portion (9) to deform the coupling ring (4) in a locking configuration in which the connection sleeve (3) is locked to the tubular member (2), wherein the coupling ring (4), when it is arranged in its locking configuration, is coupled to the connection sleeve (3) in an angularly and axially fixed manner.

* * * * *